United States Patent
Kamil Amin et al.

(10) Patent No.: US 10,310,120 B2
(45) Date of Patent: Jun. 4, 2019

(54) NOISE MITIGATION IN SEISMIC MULTIMEASUREMENT DATA

(71) Applicant: Schlumberger Technology Corporation, Sugar Land, TX (US)

(72) Inventors: Yousif Izzeldin Kamil Amin, Gatwick (GB); Massimiliano Vassallo, Gatwick (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 823 days.

(21) Appl. No.: 14/697,184

(22) Filed: Apr. 27, 2015

(65) Prior Publication Data
US 2016/0313464 A1    Oct. 27, 2016

(51) Int. Cl.
*G01V 1/36* (2006.01)
*G01V 1/38* (2006.01)

(52) U.S. Cl.
CPC ............. *G01V 1/364* (2013.01); *G01V 1/38* (2013.01); *G01V 2210/144* (2013.01); *G01V 2210/324* (2013.01)

(58) Field of Classification Search
CPC .......... G01V 1/364; G01V 1/38; G01V 1/362; G01V 2210/144; G01V 2210/324
See application file for complete search history.

(56) References Cited

U.S. PATENT DOCUMENTS

| | | | |
|---|---|---|---|
| 7,676,327 | B2 | 3/2010 | Ozdemir et al. |
| 2007/0030002 | A1 | 2/2007 | Frei et al. |
| 2008/0049551 | A1 | 2/2008 | Muyzert et al. |
| 2008/0270035 | A1 | 10/2008 | Ozdemir et al. |
| 2012/0130643 | A1 | 5/2012 | Ozdemir et al. |

(Continued)

OTHER PUBLICATIONS

Moldoveanu, N., Seymour, N., van Manen, D. J. and Caprioli, P. 2012—Broadband seismic methods for towed-streamer acquisition. 74 the EAGE Conference and Exhibition, Copenhagen, Denmark, Jun. 4-7, 2012, Extended Abstracts. (6 pages).

(Continued)

*Primary Examiner* — Manuel L Barbee
(74) *Attorney, Agent, or Firm* — Michael Guthrie (57) ABSTRACT

Computing systems, methods, and computer-readable media for noise mitigation in seismic multimeasurement data are disclosed. In some embodiments, a computer-implemented method for noise mitigation of seismic wavefield data measured by a seismic streamer is provided, where the method utilizes correlation between multiple components of the seismic wavefield data, and where the method includes adjusting a magnitude of measured inline particle motion of the seismic wavefield to not exceed a computed upper bound power spectral density of an inline component of the seismic wavefield, adjusting a magnitude of measured crossline particle motion of the seismic wavefield to not exceed a computed upper bound power spectral density of a crossline component of the seismic wavefield, adjusting a magnitude of measured vertical particle motion of the seismic wavefield to not exceed a computed upper bound power spectral density of a vertical component of the seismic wavefield, and outputting data representing the seismic wavefield.

20 Claims, 8 Drawing Sheets

(56) References Cited

U.S. PATENT DOCUMENTS

2013/0343153 A1    12/2013    Laws
2014/0219052 A1*    8/2014    Bekara .................. G01V 1/362
                                                                     367/24

OTHER PUBLICATIONS

Özbek, A., Vassallo, M., Ozdemir, K., van-Manen D.J. and Eggenberger, K. Crossline wavefield reconstruction from multicomponent streamer data: Part 2—Joint interpolation and 3-D up/down separation by generalized matching pursuit, Geophysics, vol. 75, No, 6, Nov.-Dec. 2010, WB69-W385.

Özdernir, K., A. Özbek, P. Caprioli, J. Robertsson, and E. Kragh, 2009, The optimal deghosting algorithm for broadband data combination: 79th Annual International Meeting, SEG, Expanded Abstracts, 147-151.

Robertsson, J., Moore, I., Vassallo, M., Özdemir, A.K., van Manen, D-J. and Özbek, A.—On the use of multicomponent streamer recordings for reconstruction of pressure wavefields in the crossline direction. Geophysics, 73, No. 5, Sep.-Oct. 2008, A45-A49.

Rickett, J., van Marren, D. J., Loganathan, P., and Seymour, N., 2014, "Slanted-streamer data-adaptive deghosting with local plane waves", 76th EAGE Conference and Exhibition 2014.

Vassallo, M., Özbek, A., Özdemir, K. and Eggenberger, K. [2010] Crossline wavefield reconstruction from multicomponent streamer data: Part 1—Interpolation by matching pursuit using pressure and its crossline gradient. Geophysics, 75, No. 6, Nov.-Dec. 2010, WB53-WB67.

Özbke, A., Adaptive Beamforming with Generalized Linear Constraints, 70th Ann. Internat. Mtg: Soc. of Expl. Geophys., 2081-2084, Calgary, 2000.

Özdemir, A.K., B. Kjellesvig, A. Ozbek, and J. Martin, Multiscale noise attenuation of multicomponent (4C) towed-streamer data, streamer data, SEG 80nd Annual Meeting and International Exposition, Las Vegas, 2012. (5 pages).

Rentsch, S., S. Bodyakin, L. Polanco Espezua, A. Ozbek, W.G. Brouwer and P. Watterson, Multidomain Noise Attenuation for Multimeasurement Towed Streamer Data, 75th EAGE Conference & Exhibition, 2013. (5 pages).

International Search Report and Written Opinion issued in the related PCT application PCT/US2016/029338, dated Aug. 23, 2016 (13 pages).

* cited by examiner

| Adjust a magnitude of measured inline particle motion of the seismic wavefield to not exceed a computed upper bound power spectral density of an inline component of the seismic wavefield. — 402

The computed upper bound power spectral density of an inline component of the seismic wavefield includes a product comprising an inline wavenumber and a magnitude of the wavefield. — 404

The inline wavenumber includes a product of a trigonometric function of an incidence angle and a trigonometric function of an azimuth angle. — 406

The measured inline particle motion of the seismic wavefield includes measured inline particle acceleration of the seismic wavefield. — 408

The adjusting a magnitude of measured inline particle motion of the seismic wavefield is performed by a zero phase nonlinear filter. — 410

NOISE MITIGATION IN SEISMIC MULTIMEASUREMENT DATA

BACKGROUND

Single and multi-sensor marine seismic streamers may be towed by a boat to gather seismic data representing a reflected wavefield. Such streamers may use one or more sensors, such as pressure sensors, and/or particle motion detectors (e.g., accelerometers) oriented down, inline and/or crossline to the direction that the streamer is towed. Data collected by such streamers may subsequently undergo noise reduction and other processing.

SUMMARY

In accordance with some embodiments, a computer-implemented method for noise mitigation of seismic wavefield data measured by a seismic streamer is performed, the method utilizing correlation between multiple components of the seismic wavefield data, the method including adjusting a magnitude of measured inline particle motion of the seismic wavefield to not exceed a computed upper bound power spectral density of an inline component of the seismic wavefield; adjusting a magnitude of measured crossline particle motion of the seismic wavefield to not exceed a computed upper bound power spectral density of a crossline component of the seismic wavefield; adjusting a magnitude of measured vertical particle motion of the seismic wavefield to not exceed a computed upper bound power spectral density of a vertical component of the seismic wavefield; and outputting data representing the seismic wavefield.

Embodiments of the disclosure may also provide a computing system including one or more processors; and a memory system including one or more computer-readable media storing instructions thereon that, when executed by the one or more processors, are configured to cause the computing system to perform operations. The operations may include adjusting a magnitude of measured inline particle motion of a seismic wavefield to not exceed a computed upper bound power spectral density of an inline component of the seismic wavefield; adjusting a magnitude of measured crossline particle motion of the seismic wavefield to not exceed a computed upper bound power spectral density of a crossline component of the seismic wavefield; adjusting a magnitude of measured vertical particle motion of the seismic wavefield to not exceed a computed upper bound power spectral density of a vertical component of the seismic wavefield; and outputting data representing the seismic wavefield.

In accordance with some embodiments, a computer-readable storage medium is provided, the medium having a set of one or more programs including instructions that when executed by a computing system cause the computing system to adjust a magnitude of measured inline particle motion of a seismic wavefield to not exceed a computed upper bound power spectral density of an inline component of the seismic wavefield; adjust a magnitude of measured crossline particle motion of the seismic wavefield to not exceed a computed upper bound power spectral density of a crossline component of the seismic wavefield; adjust a magnitude of measured vertical particle motion of the seismic wavefield to not exceed a computed upper bound power spectral density of a vertical component of the seismic wavefield; and output data representing the seismic wavefield.

In accordance with some embodiments, a computing system is provided that includes at least one processor, at least one memory, and one or more programs stored in the at least one memory. The computing system further includes means for adjusting a magnitude of measured inline particle motion of a seismic wavefield to not exceed a computed upper bound power spectral density of an inline component of the seismic wavefield; means for adjusting a magnitude of measured crossline particle motion of the seismic wavefield to not exceed a computed upper bound power spectral density of a crossline component of the seismic wavefield; means for adjusting a magnitude of measured vertical particle motion of the seismic wavefield to not exceed a computed upper bound power spectral density of a vertical component of the seismic wavefield; and means for outputting data representing the seismic wavefield.

In some embodiments, the computed upper bound power spectral density of an inline component of the seismic wavefield includes a product including an inline wavenumber and a magnitude of the wavefield.

In some embodiments, the inline wavenumber includes a product of a trigonometric function of and incidence angle and a trigonometric function of an azimuth angle.

In some embodiments, the computed upper bound power spectral density of a crossline component of the seismic wavefield includes a product including a crossline wavenumber and a magnitude of the wavefield.

In some embodiments, the crossline wavenumber includes a maximal feasible crossline wavenumber.

In some embodiments, the computed upper bound power spectral density of a vertical component of the seismic wavefield includes a magnitude of a ghost operator.

In some embodiments, the computed upper bound power spectral density of a vertical component of the seismic wavefield further includes an estimated upgoing wavefield.

In some embodiments, the measured inline particle motion of the seismic wavefield includes measured inline particle acceleration of the seismic wavefield; the measured crossline particle motion of the seismic wavefield includes measured crossline particle acceleration of the seismic wavefield; and the measured vertical particle motion of the seismic wavefield includes measured vertical particle acceleration of the seismic wavefield.

In some embodiments, the adjusting a magnitude of measured inline particle motion of the seismic wavefield is performed by a zero phase nonlinear filter; the adjusting a magnitude of measured crossline particle motion of the seismic wavefield is performed by a zero phase nonlinear filter; and the adjusting a magnitude of measured vertical particle motion of the seismic wavefield is performed by a zero phase nonlinear filter.

In some embodiments, the outputting includes causing a graphical display of the wavefield data.

Thus, the computing systems and methods disclosed herein are more effective methods for noise mitigation in seismic multimeasurement data. These computing systems and methods increase data processing effectiveness, efficiency, and accuracy. Such methods and computing systems may complement or replace conventional methods for noise mitigation in seismic multimeasurement data.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both, objects or steps, respectively, but they are not to be considered the same object or step.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

Figure 1:
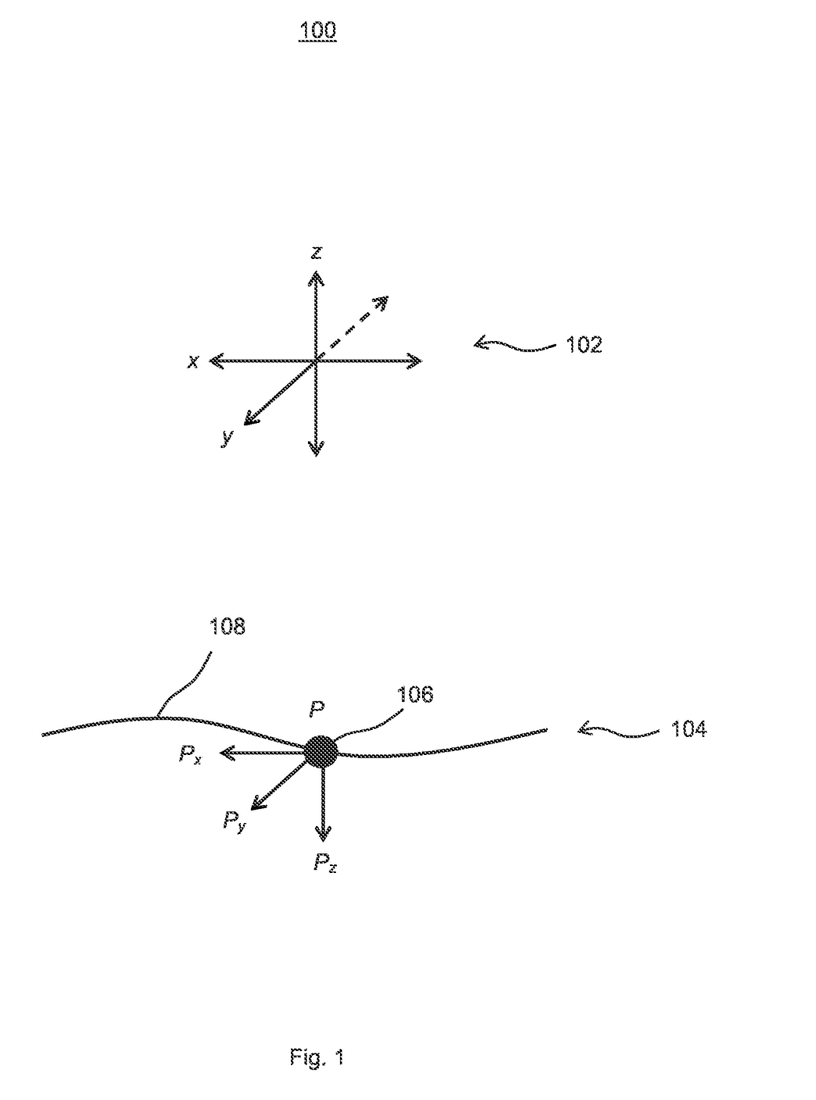
FIG. 1 is a schematic diagram of a portion of a seismic streamer in accordance with some embodiments.

FIG. 1 is a schematic diagram of a seismic streamer portion 104 in accordance with some embodiments. Seismic streamer portion 104 includes a sensor set 106 attached to cable 108. The sensor set 106 may be a multi-sensor set capable of obtaining multimeasurement data. Further, a plurality of such sensor sets 106 may be included along a cable at intervals (e.g., 1-100 meter intervals) to form a single seismic streamer. A marine vehicle may tow many seismic streamers, spaced apart (e.g., 10-100 meters or more apart), as part of a seismic survey. Such a marine vehicle may also tow seismic sources to generate a signal whose reflection is captured by the sensor sets of the seismic streamers.

To establish an orientation of an example embodiment, FIG. 1 depicts axes 102, which represent spatial dimensions relative to seismic streamer portion 104, with the x-axis running in a left and right direction relative to the page, the y-axis running into and out of the page, and the z-axis running in an up and down direction relative to the page. In an embodiment, the plane defined by the x-axis and y-axis may be parallel to the surface of a body of water, and the z-axis may be perpendicular to the surface of such a body of water. A marine vehicle may tow multiple seismic streamers, including seismic streamer portion 104, in the direction of the x-axis.

In an embodiment, the sensor set 106 may be a multi-sensor set 106 as depicted in FIG. 1. Such multi-sensor sets 106 may, in some embodiments, include four sensors: a hydrophone pressure sensor and at least one, e.g., three, particle motion sensors, which may measure velocity, acceleration, and/or pressure gradients. For example, such particle motion sensors may be or include accelerometers. Particle accelerometers may include micro-electromechanical systems, or MEMs. The particle accelerometers may measure particle acceleration in specific orientations as generated by a wavefield. For example, the particle accelerometers may measure particle acceleration in the direction of the y-axis, i.e., in a crossline direction relative to a tow direction, particle acceleration in the direction of the x-axis, i.e., in an inline direction, and/or particle acceleration in the direction of the z-axis, i.e., in a vertical direction. The hydrophone may measure ambient pressure generated by a wavefield.

Any recorded energy that interferes with the desired signal measured by the multimeasurement towed marine streamer can be considered noise. In multimeasurement marine seismic acquisition, several different sources of noise may affect the quality of the measurements and result in a suboptimal performance for further processing procedures, such as wavefield three-dimensional deghosting (see below) and crossline reconstruction. The motion of towed-streamers is an energetic source of noise on particle velocity measurements (and hence, pressure gradient signal). The particle motion sensors measure streamer-borne noise such as longitudinal, transversal and torsional noise. The dominant noise modes are the torsional vibrations. This noise is typically several orders of magnitude stronger than the noise measured by hydrophones at low and high frequencies. This noise is nonstationary in space and can also change considerably within a single record.

Efficient noise attenuation (e.g., prestack attenuation) can improve many subsequent signal processing techniques and outcomes, such as multiple removal, amplitude-versus-offset analysis, prestack inversion, and the final stack. It may be performed before prestack migration, because the migration operator smears the noise out, making it impossible to correct afterwards. Different approaches may be taken to reduce the impact of noise in multimeasurement towed marine data. For example, different pressure and particle velocity noise modes can be attenuated by optimizing the mechanical design of the streamer. As another example, the noise modes that cannot be reduced sufficiently by mechanical design may be separated from the desired signal in some domain. Such noise modes may be amenable to attenuation by digital noise processing techniques, e.g., using digital filters. Further, such methods aim to attenuate the noise while preserving signal vector fidelity.

A common noise attenuation approach in dealing with multimeasurement seismic data includes processing each measurement separately to attenuate noise outside the signal cone. However, because the measurements are correlated, some embodiments attenuation the noise within the signal cone while preserving the vector fidelity in multimeasurement data.

Some embodiments therefore utilize a spectral subtraction based approach to attenuate the noise in multimeasurement data. An example approach utilizes the correlation of the multimeasurement data to estimate the maximum power spectral density associated to the seismic wavefield, and use this as an upper bound to apply to the power spectrum of any component of the full particle motion vector measurements. The spectral samples with energy levels higher than such threshold are considered to be noise. Subtracting such noise estimate from the measured data returns an estimate of the spectral amplitude of the signal. The original phase of the measurements can be preserved in the estimated signal. Accordingly, some embodiments utilize one or more zero phase nonlinear filters with magnitude between zero and one. In addition, the resulting noise estimate can act as a preliminary noise model that can be adaptively subtracted from the measurements in a second iteration, resulting in an even more powerful noise attenuation technique.

Wavefield deghosting may generally refer to removing downgoing waves from the wavefield. In marine seismic acquisitions, the sensors record not only the desired upgoing wavefield reflected from geological formations, but also its reflections from the sea surface known as downgoing wavefield, or seismic ghost. Multi-sensor seismic streamers that include multi-sensor sets 106 may collect data suitable for algorithmic identification and separation of upgoing and reflected downgoing wavefields. This may provide for the ability to algorithmically deghost (e.g., remove reflected downgoing wavefields from) the signal. Deghosting may address the temporal frequency bandwidth, overcoming notches in the frequency band that originate from positive and destructive interferences. Such interferences may result from the presence of a free surface, such as the sea or land surface.

Assuming that the direct arrival has been removed from the measured data (the source may be shooting at a depth greater than the measuring cable depth), the measured pressure data can be written as, by way of non-limiting example, the combination of upgoing and downgoing wavefields, as well as measured noise, by way of non-limiting example, as follows.

$$P_n = U + D + n_p \quad (1)$$

In Equation 1, U represents the upgoing wavefield, D represents the downgoing wavefield, and $n_p$ represents the pressure noise. In the frequency domain, D can be written as a function of U by using the wavefield extrapolation operator $\Psi$ and the reflection coefficient $\varepsilon$ at the water-air interface, by way of non-limiting example, as follows.

$$D(f) = \varepsilon \Psi U(f) = \varepsilon e^{-j2\pi f \tau} U(f) \quad (2)$$

In Equation 2, j represents the imaginary unit $\sqrt{-1}$, f represents frequency, and $\tau$ represents the time delay that the upgoing wave will take to travel to the sea surface and reflect back to the recording seismic array. Note that $\tau$ depends on the angle of incidence of the wavefield. Note also that in the special case of vertical incidence angle, the delay $$\tau = \frac{2z}{c},$$

where z represents the cable depth and c represents the acoustic speed of seismic wave in water. More accurately, the same expression may be written in the frequency wavenumber (FK) domain, by way of non-limiting example, as follows.

$$D(f, k) = \varepsilon e^{-j2zk_z} U(f, k) \quad (3)$$

In Equation 3, the term $k_z$ represents the vertical wavenumber, which may be computed, by way of non-limiting example, as follows.

$$k_z = \frac{2\pi f}{c} \cos\theta = \sqrt{\left(\frac{2\pi f}{c}\right)^2 - k_x^2 - k_y^2} \quad (4)$$

In Equation 4, the symbol $\theta$ represents the incidence angle of the wavefield at the receiver. The terms $k_x$ and $k_y$ denote the inline and cross line wavenumbers, respectively. By substituting the expression for D given by Equation 2 or 3 into Equation 1, the following non-limiting expression for total pressure may be derived.

$$P_n = P + n_p = (1 + \varepsilon e^{-j2zk_z})U + n_p = G_p U + n_p \quad (5)$$

In Equation 5, the term $G_p$ is commonly referred to as the pressure ghost operator. The inline pressure gradient can be written, by way of non-limiting example, as follows.

$$\begin{aligned} P_{x_n} &= P_x + N_x \quad (6) \\ &= jk_x(U + D) + N_x \\ &= jk_x(1 + \varepsilon e^{-j2zk_z})U + N_x \\ &= G_x U + N_x \end{aligned}$$

In Equation 6, $P_{x_n}$ represents the measured pressure, including noise, in the direction of the x-axis, $P_x$ represents measured pressure along the x-axis without noise, $N_x$ represents noise along the x-axis, and $G_x$ represents the x-axis operator for the gradient of the pressure wavefield. The crossline pressure gradient can be written, by way of non-limiting example, as follows.

$$\begin{aligned} P_{y_n} &= P_y + N_y \quad (7) \\ &= jk_y(U + D) + N_y \\ &= jk_y(1 + \varepsilon e^{-j2zk_z})U + N_y \\ &= G_y U + N_y \end{aligned}$$

In Equation 7, the term $P_{y_n}$ represents the measured pressure, including noise, in the direction of the y-axis, $P_y$ represents measured pressure along the y-axis without noise, $N_y$ represents noise along the y-axis, and $G_y$ represents the y-axis operator for the gradient of the pressure wavefield. Considering that downgoing wave direction has opposite vertical polarity with respect to the upgoing, the vertical pressure gradient $P_z$ can be represented, by way of non-limiting example, as follows.

$$P_{z_n} = P_z + N_z \qquad (8)$$
$$= jk_z(U - D) + N_z$$
$$= jk_z(1 - \varepsilon e^{-j2zk_z})U + N_z$$
$$= G_z U + N_z$$

In Equation 8, the term $P_{z_n}$ represents the measured pressure, including noise, in the direction of the z-axis, $P_z$ represents measured pressure along the z-axis without noise, $N_z$ represents noise along the z-axis, and $G_z$ represents the z-axis operator for the gradient of the pressure wavefield. Note that the ghost operators affecting the pressure and the vertical velocity have different signs. This is because the downgoing vertical velocity wavefield reverses its direction.

The pressure gradient is proportional to the particle acceleration vector, and this relationship may be represented, by way of non-limiting example, as follows.

$$\nabla P = -\rho \alpha \qquad (9)$$

In Equation 9, the symbol $\rho$ represents the density of the medium, P represents pressure, the symbol $\nabla$ represents the vector differential operator, and a represents the acceleration vector. Therefore, the accelerometer measurements may be represented by Equations 6, 7 and 8 up to a scaling factor. This implies that particle motion measurements can be used to represent the spatial gradient of the pressure wavefield. This fact is utilized by some embodiments as described herein.

Figure 2:
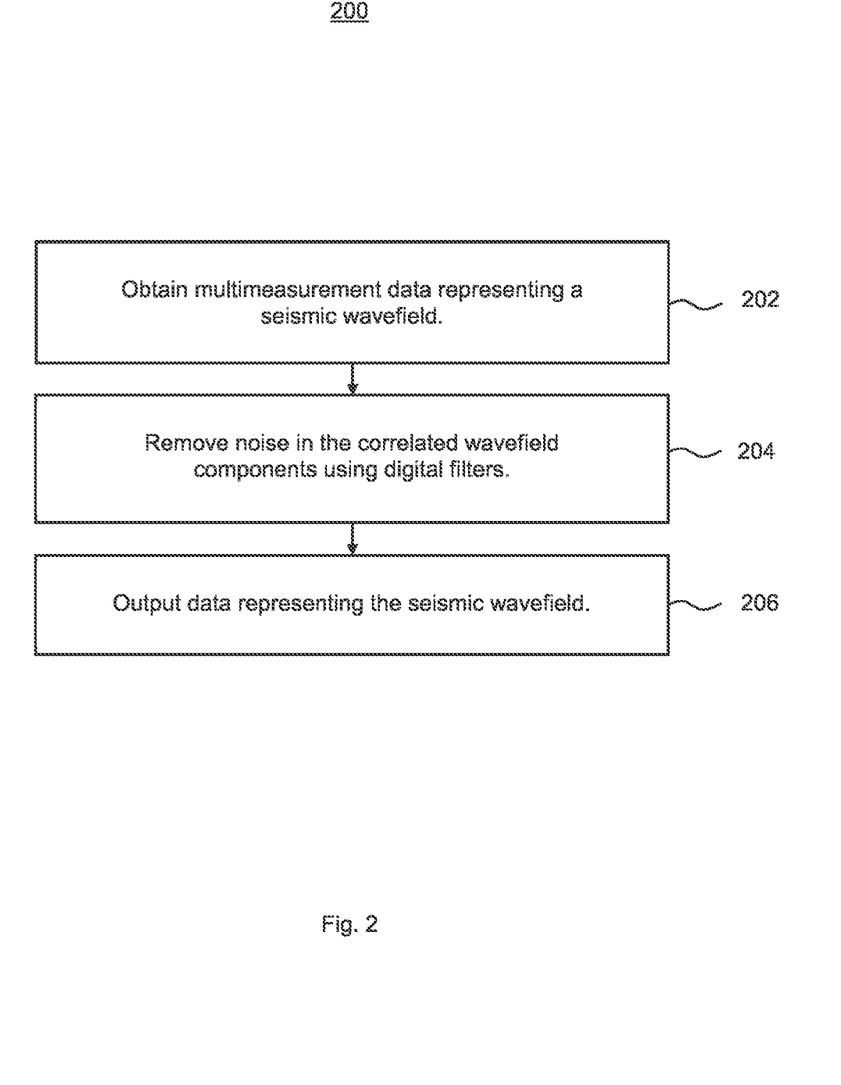
FIGS. 2, 3, 4A, 4B, 4C and 4D are workflow diagrams illustrating methods for noise mitigation of seismic wavefield data in accordance with some embodiments.

FIG. 2 is a workflow diagram illustrating a method 200 of noise mitigation of seismic wavefield data in accordance with some embodiments. The method 200 illustrated with respect to FIG. 2 may be implemented using computer resources 500 as shown and described in reference to FIG. 5. The method 200 of FIG. 2 may be implemented using data measured by one or more multi-sensor seismic streamers, e.g., multi-sensor seismic streamers that include multi-sensor seismic streamer portion 104 as shown and described above in reference to FIG. 1.

At block 202, method 200 obtains multimeasurement data representing a seismic wavefield. The data may be obtained in a variety of ways. For example, the data may be obtained by retrieval from electronic persistent memory. Such retrieval may be over a local network, from an attached electronic persistent storage device, or over a wide area network such as the internet.

In some embodiments, obtaining the data is a separate, independent, process from the process of generating the data by empirical measurement. Thus, in some embodiments, seismic data may be measured by one entity through the usage of seismic streamers towed by a marine vehicle and then stored in an electronic persistent memory. A different entity, or the same entity, may then obtain the seismic data by electronically accessing the electronic persistent memory, whether directly or over a network.

At block 204, the method 200 removes noise in the correlated wavefield components using digital filters. Note that Equations 5-8 relate the measurements P, $P_x$, $P_y$ and $P_z$ to the upgoing wave U. Thus, P, $P_x$, $P_y$ and $P_z$ are correlated due to the physical geometry of U, e.g., as exhibited through the use of operators $G_x$, $G_y$, $G_z$. Moreover, this observation reveals that $P_x$, $P_y$ and $P_z$ can be filtered in a manner that makes use of the correlation to attenuate noise within the signal cone, thus preserving fidelity of the signal vector. Digital filters, such as those described below in reference to Equations 12, 15 and 23 may therefore be applied to each component as part of block 204. More generally, digital filters that rely on the correlation of P, $P_x$, $P_y$ and $P_z$ may be applied at this block.

At block 206, the method 200 outputs the noise-attenuated component data produced at block 204. The output may include the data itself, it may include a wavefield representation corresponding to the noise-attenuated data, it may include a graphical representation of the wavefield corresponding to the noise-attenuated data, or it may include a combination of any of the preceding. The output may be to electronic persistent storage, to a program module (e.g., for further processing), or to a human-readable display. Other types of output are also possible.

Figure 3:
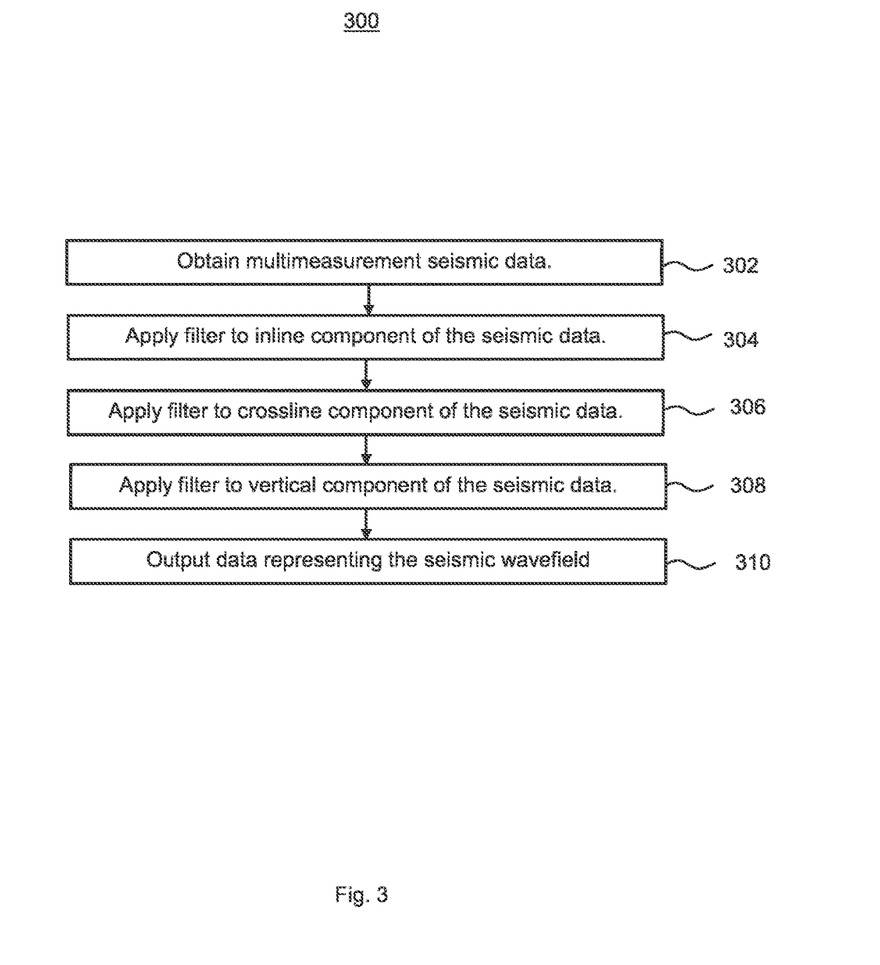

FIG. 3 is a workflow diagram illustrating a method 300 of noise mitigation of seismic wavefield data in accordance with some embodiments. The method 300 illustrated with respect to FIG. 3 may be implemented using computer resources 500 as shown and described in reference to FIG. 5. The method 300 of FIG. 3 may be implemented using data measured by a plurality of seismic streamers, e.g., multi-sensor seismic streamers that include multi-sensor seismic streamer portion 104 as shown and described above in reference to FIG. 1.

At block 302, the method 300 obtains multimeasurement seismic data representing a wavefield. The data may be obtained by retrieving it from electronic persistent memory, e.g., over a local network, from an attached electronic persistent storage device, or over a wide area network such as the internet. That is, the data may be obtained as shown and described above in reference to block 202 of FIG. 2.

The data obtained at block 302 may have been previously generated by empirical measurement and stored in electronic persistent memory for retrieval per block 302. Such previous generation may have included measurement by multi-sensor seismic streamers towed by a marine vehicle as shown and described above in reference to FIG. 1.

At block 304, the method 300 applies a filter to the inline component of the seismic data. For purposes of calculation, a non-limiting assumption is made that the pressure data has a relatively high signal-to-noise ratio. Toward characterizing an inline component filter according to some embodiments, this disclosure describes presently a formulation of the inline and crossline measurement data. Note that these measurements may have the same ghost model (up to a variable scalar) as the pressure data. From Equations 5-7, the following applies.

$$P_{x,y} = jk_{x,y} P \qquad (10)$$

Equation 10 relates to the noise attenuation approach described presently for the inline and crossline measurements. A similar concept relates and will be extended to the vertical wavenumber. Because the streamers are densely sampled in the inline direction, the exact inline wavenumber ($k_x$) may be obtained. It is known that $$k_x = \frac{2\pi f}{c} \cos\theta \sin\phi,$$

where $\theta$ and $\phi$ are the incidence and the azimuth angles, respectively. Then the ratio of the magnitude of the noise-free inline gradient to the respective wave number equals the magnitude of the pressure signal without noise, as represented by way of non-limiting example as follows.

$$\frac{|P_x|}{k_x} = |P| \tag{11}$$

In Equation 11, $P_x$ is the noise free inline gradient. According to some embodiments, deviations from the above relation are due to noise. Therefore, some embodiments force this relation to be true by applying a filter to the magnitude of the inline gradient and by not touching the phase. A suitable filter may be represented as, by way of non-limiting example, the following.

$$|P_{x_n}| = \begin{cases} k_x|P| & \text{if } \frac{\alpha|P_{x_n}|}{k_x} \geq |P| \\ |P_{x_n}| & \text{otherwise} \end{cases} \tag{12}$$

In Equation 11, the term $\alpha$ is a user parameter noise subtraction coefficient $0 \leq \alpha \leq 1$ that controls the severity of noise attenuation. Thus, $\alpha$ may be user-adjustable in some embodiments.

At block 306, the method 300 applies a filter to the crossline component of the seismic data. The crossline sampling in multimeasurement towed marine data may be coarse, and therefore obtaining the crossline wavenumber may present challenges. Therefore, for some embodiments, an approach slightly different from that applied to the inline component of the seismic data may be applied to the crossline component of the seismic data. Because $$k_y = \frac{2\pi f}{c} \sin\theta \sin\phi,$$

an example maximum crossline wavenumber of the spatial bandwidth of the signal, referred to by the term $k_{y_{max}}$, is derived presently. In the frequency space domain, the crossline wavenumber should be less than the absolute wavenumber $$k = \frac{2\pi f}{c}.$$

Therefore, the maximum feasible crossline wavenumber can be calculated, by way of non-limiting example, as follows.

$$k_{y_{max}} = \min\left(\text{abs}\left(\frac{2\pi f}{c}\right), k_{y_{max,prior}}\right) \tag{13}$$

In Equation 13, the term $k_{y_{max,prior}}$ represents a maximum crossline wavenumber of the signals known a priori, when such information is available, e.g., from the geometry of the streamers. (Alternately, according to some embodiments, the maximal feasible crossline wavenumber is calculated based on a frequency, a water velocity and an inline wavenumber.) As a result, the following relation, by way of non-limiting example, holds for noise-free data.

$$\frac{|P_y|}{k_{y_{max}}} \leq |P| \tag{14}$$

Deviations from this relation can be attributed to the noise, and a similar filter to that of Equation 12 can be designed, by way of non-limiting example, as follows.

$$|P_{y_n}| = \begin{cases} k_{y_{max}}|P| & \text{if } \alpha\frac{|P_{y_n}|}{k_{y_{max}}} \geq |P| \\ |P_{y_n}| & \text{otherwise} \end{cases} \tag{15}$$

In Equation 15, the term $\alpha$ represents a user-adjustable parameter noise subtraction coefficient $0 \leq \alpha \leq 1$, which controls the severity of noise attenuation. Because this filter may be applied in the frequency space domain, events should propagate with an approximately equal crossline wavenumber within the window.

Some embodiments apply the crossline filter in the frequency-inline-wavenumber domain (or the frequency-inline-slowness domain). For such embodiments, the maximum crossline wavenumber may be formulated, by way of non-limiting example, as follows.

$$k_{y_{max}} = \sqrt{\left(\frac{2\pi f}{c}\right)^2 - k_x^2} \tag{16}$$

With this adjustment, an analogous filter to that of Equation 15 may be applied. For such embodiments, a useful assumption is that within the window of interest, events with the same inline wavenumber propagate with an approximately similar crossline wavenumber.

A pragmatic assumption for the calculation of the filters of Equations 12 and 15 is that a relatively high signal-to-noise ratio exists for the pressure data, in order to act as a reference to attenuate the noise in the various component particle velocity data. For purposes of calculation, if Equation 14 does not hold due to the noise, then the following holds, by way of non-limiting example.

$$|P| \leq \frac{|P_{y_n}|}{k_{y_{max}}} \tag{17}$$

From Equation 17 and the triangle inequality, the following, by way of non-limiting example, holds as well.

$$|P| \leq \frac{|P_{y_n}|}{k_{y_{max}}} \leq \frac{|P_y| + |N_y|}{k_{y_{max}}} \tag{18}$$

Therefore, from Equation 14, the following holds.

$$|P| \leq |P| + \frac{|N_y|}{k_{y_{max}}} \tag{19}$$

Accordingly, in low signal-to-noise ratio scenarios, embodiments may obtain an estimate of $|P|$ using an estimate of the noise in pressure. This may be a cause of distortion to the data. Therefore, the parameter $\alpha$ may be used to reduce any distortion as a result of this. Alternately, some embodiments omit $\alpha$, e.g., setting its value to one.

Thus, block 306 may apply the filter defined by Equation 15 (e.g., as adjusted by Equation 16) to the crossline component of the seismic data. Embodiments may permit a user to adjust α, or this parameter may be omitted.

At block 308, the method 300 applies a filter to the vertical component of the seismic data. In the vertical gradient case, because the ghost operator of vertical gradient is different than the one for pressure (see Equation 8), a different approach may be employed. To relate the pressure to the upper limit of the vertical gradient, the data is deghosted. Note that deghosting the pressure may be difficult in practice because, e.g., the crossline sampling is typically coarse and some assumptions regarding the vertical wavenumber may be employed. However, for the purpose of noise attenuation, these assumptions can be sufficient.

In order to estimate the vertical gradient, the upgoing wavefield may be first estimated. Various techniques can be used for this purpose. By way of non-limiting example, from Equation 5, the following holds.

$$\hat{U} = \frac{\tilde{G}_P^*}{\tilde{G}_P \tilde{G}_P^* + \gamma} P_n \qquad (20)$$

In Equation 20, the symbol * represents a complex conjugate operator, and γ is a stabilization factor. The term $\tilde{G}_P$ represents the approximated pressure ghost operator, which may be defined as, by way of non-limiting example, the following.

$$\tilde{G}_P = (1 + \varepsilon e^{-j2zk_{z_{est}}}) \qquad (21)$$

In Equation 21, the term $k_{z,est}$ is the estimated vertical wavenumber. The zero crossline wavenumber may be represented as follows, by way of non-limiting example.

$$k_{z_{est}} = \sqrt{\left(\frac{2\pi f}{c}\right)^2 - k_x^2} \qquad (22)$$

From Equation 22, a vertical gradient reference may be estimated by re-ghosting the estimated upgoing wave by the vertical ghost operator, which may be represented as follows, by way of non-limiting example.

$$P_{z,ref} = G_{z,max} \hat{U} \qquad (21)$$

In Equation 21, the term $G_{z,max}$ represents the maximum possible ghost operator, an upper bound. This term may be defined, by way of non-limiting example, as follows.

$$G_{z,max} = \max[jk_{z,est}(1+\varepsilon e^{-j2zk_{z,est}})] \qquad (22)$$

Note that $G_{z,max}$ may have as an upper bound $$\frac{4\pi f}{c}.$$

The deghosted re-ghosted reference $P_{z,ref}$ may then be compared against the vertical gradient measurement, and an analogous filter to that of Equation 12 can be defined, by way of non-limiting example, as follows.

$$|P_{z_n}| = \begin{cases} |P_{z,ref}| & \text{if } \alpha|P_{z_n}| \geq |P_{z,ref}| \\ |P_{z_n}| & \text{otherwise} \end{cases} \qquad (23)$$

For the filter of Equation 23, the factor α may be smaller to account for any approximations used in the deghosting-reghosting process.

The filters of Equations 12, 15 and 23 may be characterized as zero phase nonlinear filters with a transfer function magnitude response in the range [0,1]. All the aforementioned filters may be applied in domains other than frequency space, and frequency wavenumber including time-space, tau-p, frequency-p, etc.

At block 310, the method 300 outputs data representing the seismic wavefield, having been processed using one or more of the filters described in reference to Equations 12, 15 and 23. The output may include the data itself, a graphical representation of the wavefield corresponding to such data, or it may include a combination of any of the preceding. The output may be to electronic persistent storage, to a program module, or to a human-readable display. Other types of output are also possible.

Attention is now directed to FIGS. 4A, 4B, 4C, and 4D, which are flow diagrams illustrating a method 400 of noise mitigation in seismic multimeasurement data, in accordance with some implementations. Some operations in method 400 may be combined and/or the order of some operations may be changed. Further, some operations in method 400 may be combined with aspects of the example workflows of FIGS. 2 and/or 3, and/or the order of some operations in method 400 may be changed to account for incorporation of aspects of the workflow illustrated by one or more of FIGS. 2 and/or 3.

Figure 4A:
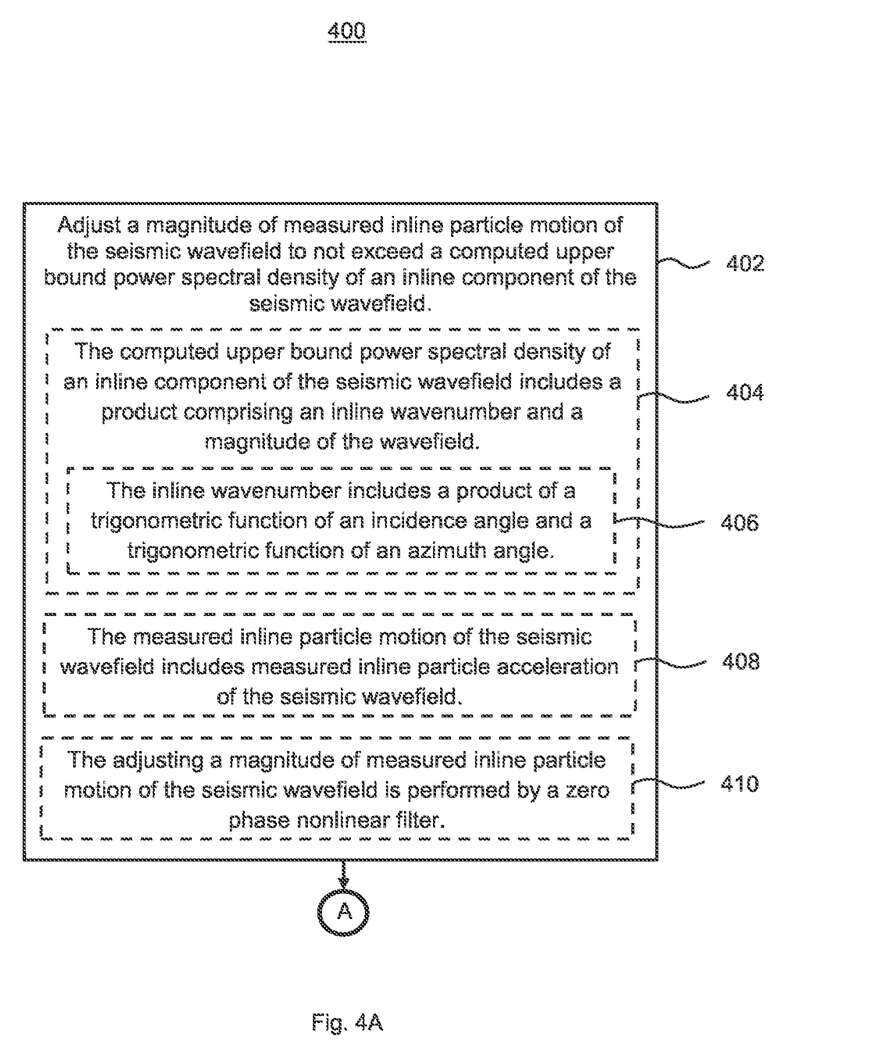

Referring now specifically to the illustrated embodiments, as shown in FIG. 4A, the method 400 may include adjusting a magnitude of measured inline particle motion of the seismic wavefield to not exceed a computed upper bound power spectral density of an inline component of the seismic wavefield, as at 402 (e.g., FIG. 2, 204, remove noise in the correlated wavefield components using digital filters, FIG. 3, 304, apply filter to inline component of the seismic data). In an embodiment, the computed upper bound power spectral density of an inline component of the seismic wavefield may include a product comprising an inline wavenumber and a magnitude of the wavefield, as at 404. It will be appreciated, however, that embodiments that omit block 404 are specifically contemplated herein. In an embodiment, the inline wavenumber may a product of a trigonometric function of an incidence angle and a trigonometric function of an azimuth angle, as at 406. It will be appreciated, however, that embodiments that omit block 406 are specifically contemplated herein. In an embodiment, the measured inline particle motion of the seismic wavefield may include measured inline particle acceleration of the seismic wavefield, as at 408. It will be appreciated, however, that embodiments that omit block 408 are specifically contemplated herein. In an embodiment, the adjusting a magnitude of measured inline particle motion of the seismic wavefield may be performed by a zero phase nonlinear filter, as at 410. It will be appreciated, however, that embodiments that omit block 410 are specifically contemplated herein.

Figure 4B:
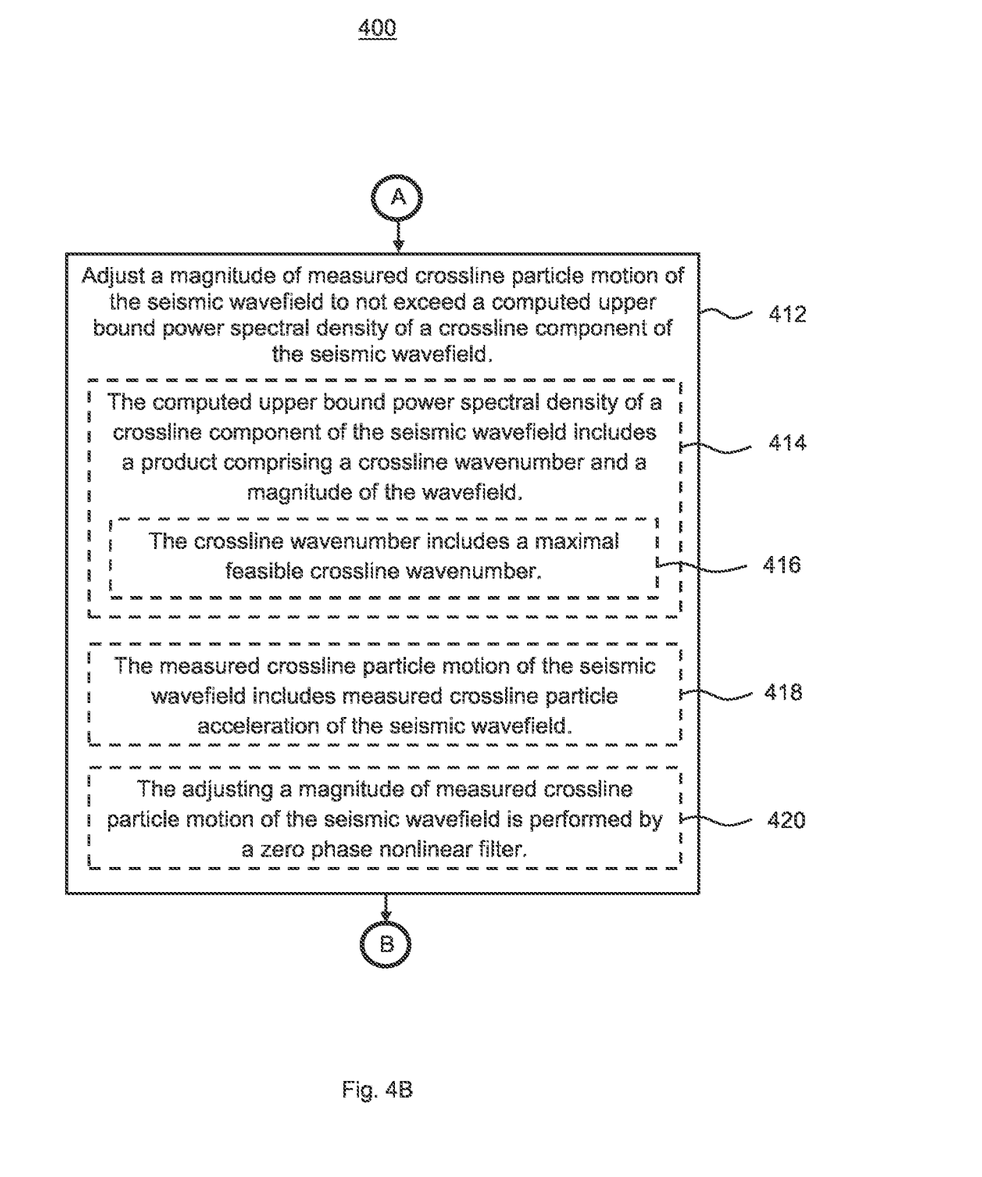

As shown in FIG. 4B, the method 400 may include adjusting a magnitude of measured crossline particle motion of the seismic wavefield to not exceed a computed upper bound power spectral density of an crossline component of the seismic wavefield, as at 412 (e.g., FIG. 2, 204, remove noise in the correlated wavefield components using digital filters, FIG. 3, 306, apply filter to crossline component of the seismic data). In an embodiment, the computed upper bound power spectral density of an crossline component of the seismic wavefield may include a product comprising a crossline wavenumber and a magnitude of the wavefield, as at 414. It will be appreciated, however, that embodiments that omit block 414 are specifically contemplated herein. In an embodiment, the crossline wavenumber may include a maximal feasible crossline wavenumber, as at 416. It will be appreciated, however, that embodiments that omit block 416 are specifically contemplated herein. In an embodiment, the measured crossline particle motion of the seismic wavefield may include measured crossline particle acceleration of the seismic wavefield, as at 418. It will be appreciated, however, that embodiments that omit block 418 are specifically contemplated herein. In an embodiment, the adjusting a magnitude of measured crossline particle motion of the seismic wavefield may be performed by a zero phase nonlinear filter, as at 420. It will be appreciated, however, that embodiments that omit block 420 are specifically contemplated herein.

Figure 4C:
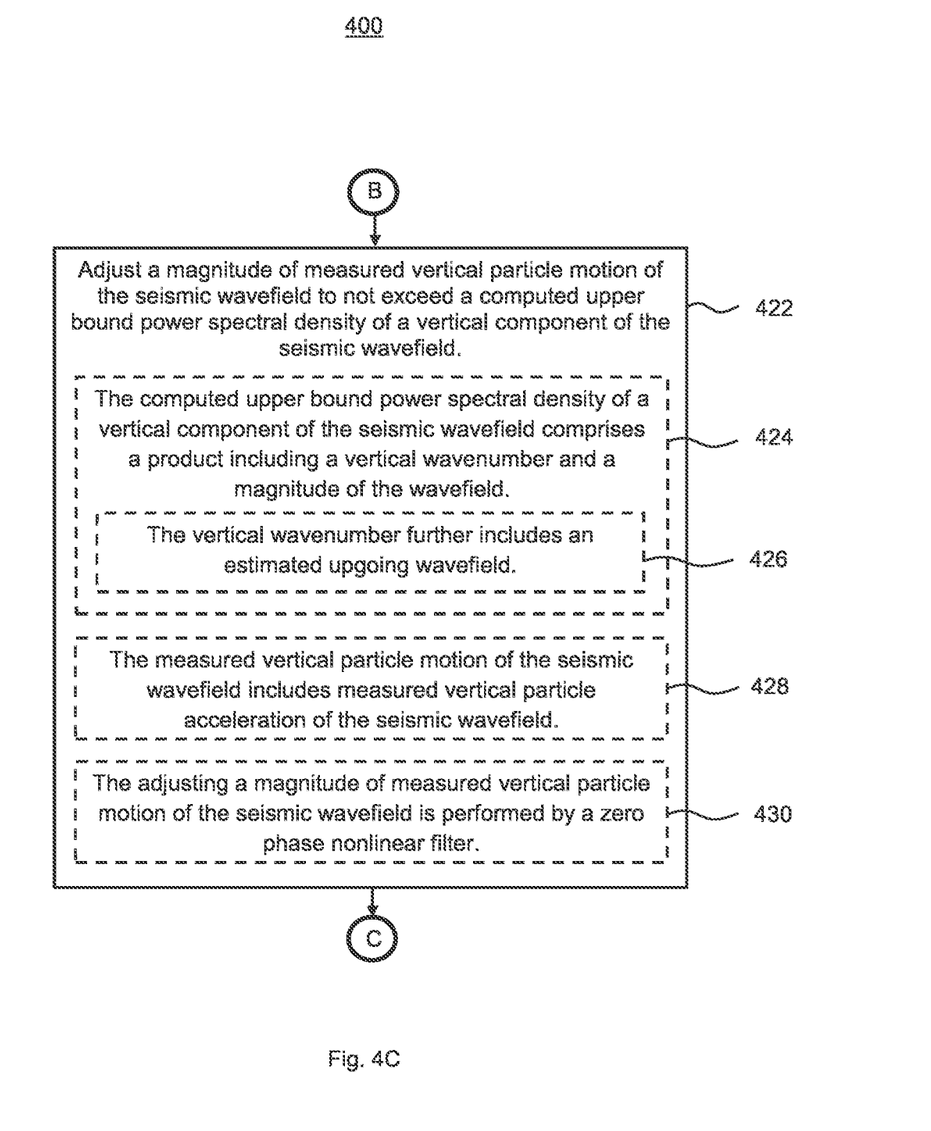

As shown in FIG. 4C, the method 400 may include adjusting a magnitude of measured vertical particle motion of the seismic wavefield to not exceed a computed upper bound power spectral density of a vertical component of the seismic wavefield, as at 422 (e.g., FIG. 2, 204, remove noise in the correlated wavefield components using digital filters, FIG. 3, 308, apply filter to vertical component of the seismic data). In an embodiment, the computed upper bound power spectral density of a vertical component of the seismic wavefield may include a product comprising a vertical wavenumber and a magnitude of the wavefield, as at 424. It will be appreciated, however, that embodiments that omit block 424 are specifically contemplated herein. In an embodiment, the vertical wavenumber may further include an estimated upgoing wavefield, as at 426. It will be appreciated, however, that embodiments that omit block 426 are specifically contemplated herein. In an embodiment, the measured vertical particle motion of the seismic wavefield may include measured vertical particle acceleration of the seismic wavefield, as at 428. It will be appreciated, however, that embodiments that omit block 428 are specifically contemplated herein. In an embodiment, the adjusting a magnitude of measured vertical particle motion of the seismic wavefield may be performed by a zero phase nonlinear filter, as at 430. It will be appreciated, however, that embodiments that omit block 430 are specifically contemplated herein.

Figure 4D:
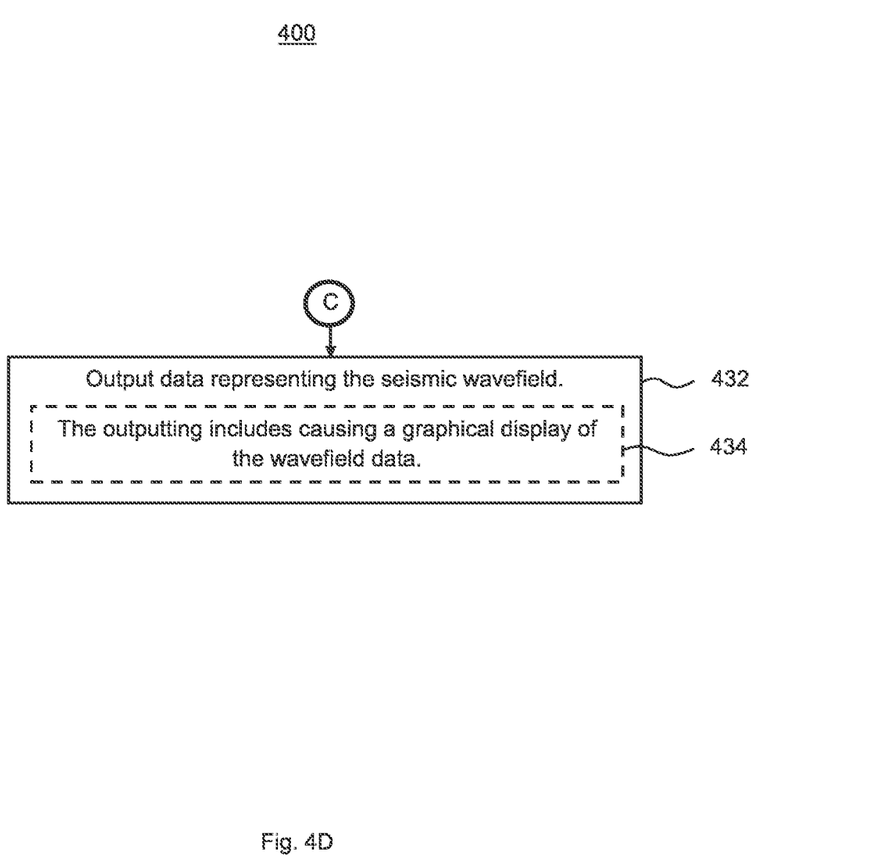

As shown in FIG. 4D, the method 400 may include outputting data representing the seismic wavefield, as at 432 (e.g., FIG. 2, 206, output data representing the seismic wavefield, FIG. 3, 310, output data representing the seismic wavefield). In an embodiment, the outputting may include causing a graphical display of the wavefield data, as at 434.

Although example embodiments are described herein in terms of marine data acquisition, in general, embodiments are not so limited. Seismic data may be acquired terrestrially, on the sea floor, transition zones, or elsewhere. Thus, seismic data generally need not be acquired using marine seismic streamers such as those shown and discussed above in reference to FIG. 1.

Figure 5:
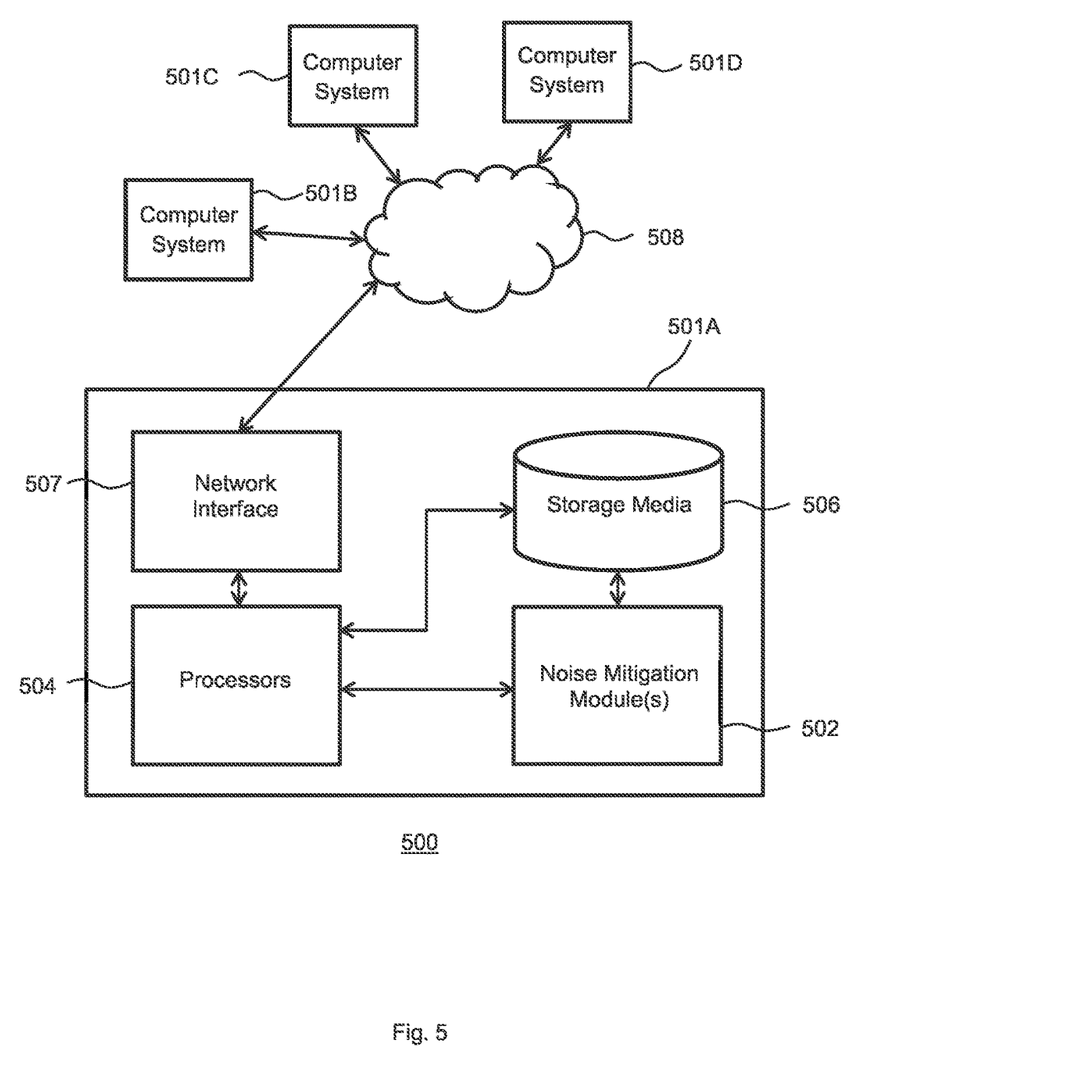
FIG. 5 illustrates a computing system in accordance with some embodiments.

In some embodiments, one or more aspects (e.g. operations) of the methods 200, 300, and/or 400 may be executed by a computing system. FIG. 5 illustrates an example computing system arrangement 500 in accordance with some embodiments. Computing system arrangement 500 may be an individual computer system or an arrangement of distributed computer systems. Computer system 501A includes one or more noise mitigation modules 502 that are configured to perform various tasks according to some embodiments, such as one or more methods disclosed herein (e.g., methods 200, 300 and 400, and/or combinations and/or variations thereof). To perform these various tasks, noise mitigation module 502 executes independently, or in coordination with, one or more processors 504, which is (or are) connected to one or more storage media 506. The processor (s) 504 is (or are) also connected to a network interface 507 to allow the computer system 501A to communicate over a data network 508 with one or more additional computer systems and/or computing systems, such as 501B, 501C, and/or 501D (note that computer systems 501B, 501C and/or 501D may or may not share the same architecture as computer system 501A, and may be located in different physical locations, e.g., computer systems 501A and 501B may be in the field and/or on a laboratory, while in communication with one or more computer systems such as 501C and/or 501D that are located in one or more data centers, and/or located in varying countries on different continents and/or on various marine vehicles). Processors 504 may include a microprocessor, microcontroller, processor module or subsystem, programmable integrated circuit, programmable gate array, or another control or computing device.

The storage media 506 may be implemented as one or more computer-readable or machine-readable storage media. Note that while in the example embodiment of FIG. 5 storage media 506 is depicted as within computer system 501A, in some embodiments, storage media 506 may be distributed within and/or across multiple internal and/or external enclosures of computing system 501A and/or additional computing systems. Storage media 506 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BluRays, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

As described, computing system 501A contains one or more noise mitigation module(s) 502. In the example of computing system 501A, computer system 501A includes noise mitigation module 502, which executes the noise mitigation procedures described herein. In some embodiments, a single noise mitigation module may be used to perform some or all aspects of methods 200, 300 and 400. In alternate embodiments, a plurality of noise mitigation modules may be used to perform some or all aspects of methods 200, 300 and 400.

It should be appreciated that computing system arrangement 500 is only one example of a computing system, and that computing system arrangement 500 may have more or fewer components than shown, may combine additional components not depicted in the example embodiment of FIG. 5, and/or computing system arrangement 500 may have a different configuration or arrangement of the components depicted in FIG. 5. The various components shown in FIG. 5 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for noise mitigation of seismic wavefield data measured by a multi-sensor seismic streamer towed by a marine vehicle, the method utilizing correlation between multiple components of the seismic wavefield data, the method comprising:
    adjusting, by at least one electronic programmed processor, a magnitude of inline particle motion of a seismic wavefield measured by the multi-sensor seismic streamer towed by the marine vehicle to not exceed a computed upper bound power spectral density of an inline component of the seismic wavefield;
    adjusting, by at least one electronic programmed processor, a magnitude of measured crossline particle motion of the seismic wavefield to not exceed a computed upper bound power spectral density of a crossline component of the seismic wavefield;
    adjusting, by at least one electronic programmed processor, a magnitude of measured vertical particle motion of the seismic wavefield to not exceed a computed upper bound power spectral density of a vertical component of the seismic wavefield; and
    outputting, by at least one electronic programmed processor, data representing the seismic wavefield.

2. The method of claim 1, wherein the computed upper bound power spectral density of an inline component of the seismic wavefield comprises a product comprising an inline wavenumber and a magnitude of the wavefield.

3. The method of claim 2, wherein the inline wavenumber comprises a product of a trigonometric function of and incidence angle and a trigonometric function of an azimuth angle.

4. The method of claim 1, wherein the computed upper bound power spectral density of a crossline component of the seismic wavefield comprises a product comprising a crossline wavenumber and a magnitude of the wavefield.

5. The method of claim 4, wherein the crossline wavenumber comprises a maximal feasible crossline wavenumber.

6. The method of claim 1, wherein the computed upper bound power spectral density of a vertical component of the seismic wavefield comprises a magnitude of a ghost operator.

7. The method of claim 6, wherein the computed upper bound power spectral density of a vertical component of the seismic wavefield further comprises an estimated upgoing wavefield.

8. The method of claim 1, wherein:
    the measured inline particle motion of the seismic wavefield comprises measured inline particle acceleration of the seismic wavefield;
    the measured crossline particle motion of the seismic wavefield comprises measured crossline particle acceleration of the seismic wavefield; and
    the measured vertical particle motion of the seismic wavefield comprises measured vertical particle acceleration of the seismic wavefield.

9. The method of claim 1, wherein:
    the adjusting a magnitude of measured inline particle motion of the seismic wavefield is performed by a zero phase nonlinear filter;
    the adjusting a magnitude of measured crossline particle motion of the seismic wavefield is performed by a zero phase nonlinear filter; and
    the adjusting a magnitude of measured vertical particle motion of the seismic wavefield is performed by a zero phase nonlinear filter.

10. The method of claim 1, wherein the outputting comprises causing a graphical display of the wavefield data.

11. A computing system, comprising:
    one or more processors; and
    a memory system comprising one or more computer-readable media storing instructions thereon that, when executed by the one or more processors, are configured to cause the computing system to perform operations, the operations comprising:
        adjusting a magnitude of inline particle motion of a seismic wavefield measured by a multi-sensor seismic streamer towed by a marine vehicle to not exceed a computed upper bound power spectral density of an inline component of the seismic wavefield;
        adjusting a magnitude of crossline particle motion of the seismic wavefield to not exceed a computed upper bound power spectral density of a crossline component of the seismic wavefield;
        adjusting a magnitude of vertical particle motion of the seismic wavefield to not exceed a computed upper bound power spectral density of a vertical component of the seismic wavefield; and
        outputting data representing the seismic wavefield.

12. The system of claim 11, wherein the computed upper bound power spectral density of an inline component of the seismic wavefield comprises a product comprising an inline wavenumber and a magnitude of the wavefield.

13. The system of claim 11, wherein the inline wavenumber comprises a product of a trigonometric function of and incidence angle and a trigonometric function of an azimuth angle.

14. The system of claim 11, wherein the computed upper bound power spectral density of a crossline component of the seismic wavefield comprises a product comprising a crossline wavenumber and a magnitude of the wavefield.

15. The system of claim 14, wherein the crossline wavenumber comprises a maximal feasible crossline wavenumber.

16. The system of claim 11, wherein the computed upper bound power spectral density of a vertical component of the seismic wavefield comprises a magnitude of a ghost operator.

17. The system of claim 16, wherein the computed upper bound power spectral density of a vertical component of the seismic wavefield further comprises an estimated upgoing wavefield.

18. The system of claim 11, wherein:
the measured inline particle motion of the seismic wavefield comprises measured inline particle acceleration of the seismic wavefield;
the measured crossline particle motion of the seismic wavefield comprises measured crossline particle acceleration of the seismic wavefield; and
the measured vertical particle motion of the seismic wavefield comprises measured vertical particle acceleration of the seismic wavefield.

19. The system of claim 11, further comprising:
a zero phase nonlinear filter configured to perform the adjusting a magnitude of measured inline particle motion of the seismic wavefield;
a zero phase nonlinear filter configured to perform the adjusting a magnitude of measured crossline particle motion of the seismic wavefield; and
a zero phase nonlinear filter configured to perform the adjusting a magnitude of measured vertical particle motion of the seismic wavefield.

20. The system of claim 11, wherein the outputting comprises causing a graphical display of the wavefield data.

* * * * *